United States Patent
Zeyfang

(10) Patent No.: US 9,068,682 B2
(45) Date of Patent: *Jun. 30, 2015

(54) OPEN ENDED INDUSTRIAL PIPE CAP FOR SMALLER DIAMETER PIPES

(71) Applicant: Protective Industries, Inc., Buffalo, NY (US)

(72) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,643

(22) Filed: Dec. 20, 2012

(65) Prior Publication Data

US 2014/0174584 A1    Jun. 26, 2014

(51) Int. Cl.
   *F16L 57/00* (2006.01)
(52) U.S. Cl.
   CPC .................................... *F16L 57/005* (2013.01)
(58) Field of Classification Search
   USPC ....... 138/96 R, 96 T; 220/265, 266, 268, 269, 220/270
   See application file for complete search history.

(56) References Cited

U.S. PATENT DOCUMENTS

| | | | |
|---|---|---|---|
| 906,875 A | 12/1908 | Hammer | |
| 1,214,675 A | 2/1917 | Heath | |
| 1,584,313 A | 5/1926 | Mallory | |
| 1,600,860 A | 9/1926 | Young | |
| 1,758,613 A | 5/1930 | Lafal | |
| 2,108,583 A | 2/1938 | Falk | |
| 2,130,609 A | 9/1938 | Alexander | |
| 2,133,049 A | 10/1938 | Shimer | |
| 2,143,480 A | 1/1939 | Gunderman | |
| 2,157,842 A | 5/1939 | Armitage et al. | |
| 2,316,013 A | 4/1943 | Mulholland | |
| 2,544,969 A * | 3/1951 | Underwood | 413/17 |
| 2,898,943 A | 8/1959 | Kennedy | |
| 3,276,613 A | 10/1966 | Bozek | |
| 3,511,402 A | 5/1970 | Cheeley | |
| 3,733,002 A | 5/1973 | Fujio | |
| 3,799,381 A | 3/1974 | Action | |
| 3,911,960 A | 10/1975 | Filmon | |
| 3,996,966 A * | 12/1976 | Princell | 138/89 |
| 4,239,062 A * | 12/1980 | Callicoatte | 138/96 R |

(Continued)

FOREIGN PATENT DOCUMENTS

| | | |
|---|---|---|
| DE | 28 34 489 | 2/1980 |
| DE | 102 22 308 | 11/2003 |
| FR | 1125546 | 6/1956 |

*Primary Examiner* — James Hook
(74) *Attorney, Agent, or Firm* — Brian B. Shaw, Esq.; Harter Secrest & Emery LLP

(57) ABSTRACT

An open ended cap for an industrial pipe is provided, comprising a flexible tubular body having first and second open ends, the first end having an inwardly-extending radial rim serving as an abutment surface for a pipe when inserted into the end cap, the rim extending in a plane perpendicular to the longitudinal axis of the tubular body of the end cap, and a detachable finger grip member, with the finger grip member being connected to a tear strip extending downwardly along at least a portion of the longitudinal extent of the tubular body, the rim having a gap within at least a portion thereof across which the finger grip member extends, and the finger grip member including a gripping portion extending into the interior of the open first end and adjacent to a portion of the rim.

12 Claims, 2 Drawing Sheets

(56) References Cited

U.S. PATENT DOCUMENTS

| | | | |
|---|---|---|---|
| 4,487,229 A | 12/1984 | Dreyfuss et al. | |
| 4,538,740 A | 9/1985 | Peterson | |
| 4,616,679 A | 10/1986 | Benton | |
| 5,080,245 A | 1/1992 | Conard | |
| 5,129,531 A | 7/1992 | Beck et al. | |
| 5,292,018 A | 3/1994 | Travisano | |
| 5,996,833 A | 12/1999 | Lencioni et al. | |
| 6,176,267 B1 * | 1/2001 | Dugan et al. | 138/89 |
| 6,237,790 B1 | 5/2001 | Verderber | |
| 6,499,616 B2 | 12/2002 | Verderber | |
| 6,655,553 B2 | 12/2003 | Staniszewski et al. | |
| 6,854,616 B2 * | 2/2005 | Steffan | 220/270 |
| D615,164 S | 5/2010 | Zeyfang | |
| D617,426 S | 6/2010 | Zeyfang | |
| 8,051,879 B2 | 11/2011 | Zeyfang | |
| 2010/0200098 A1 * | 8/2010 | Zeyfang | 138/89 |
| 2010/0326560 A1 | 12/2010 | Zeyfang | |
| 2012/0227854 A1 | 9/2012 | Zeyfang | |
| 2014/0124084 A1 * | 5/2014 | Zeyfang | 138/96 R |

\* cited by examiner

FIG. 4
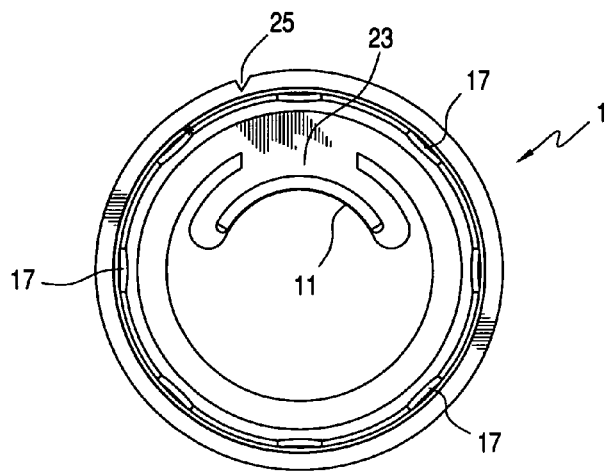
FIG. 5
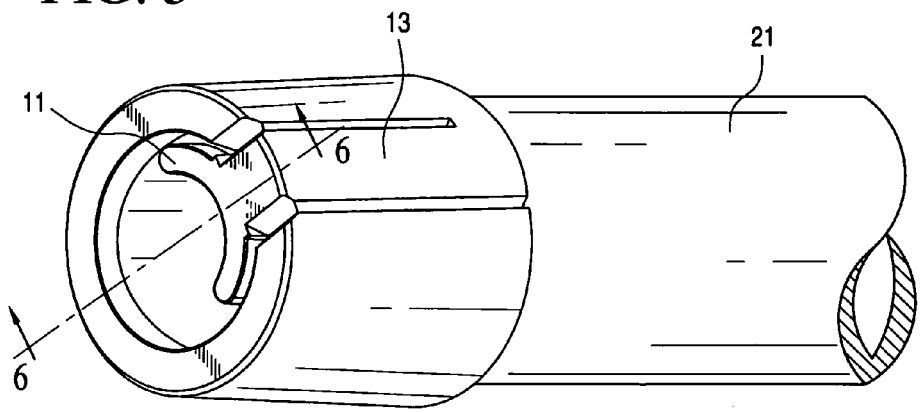
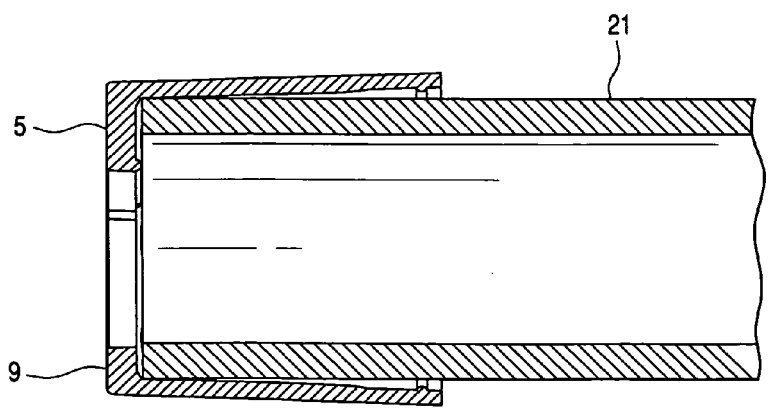
FIG. 6

OPEN ENDED INDUSTRIAL PIPE CAP FOR SMALLER DIAMETER PIPES

BACKGROUND OF THE INVENTION

The present invention is directed to an open ended cap for industrial pipes.

Open ended pipe caps have been used for many years to protect the threaded ends of black pipe and conduit. The caps typically have a uniform wall thickness and are difficult to install, frequently fall off during transportation and handling, and are difficult to remove. To prevent the caps from prematurely falling off, the caps are frequently intentionally undersized in relation to the pipe to be protected to provide a higher degree of interference between the pipe and the cap. However, this solution has not always been successful, as the caps at times still fall off. Further, the added interference between the end cap and the pipe makes the end cap very difficult to remove, and the end user often is forced to use a knife or tool to aid in the removal of the end cap from the pipe. This often damages the threads that the end cap was originally put on the pipe to protect.

Smaller diameter pipes present additional problems. The fact that the pipe is smaller in diameter results in the need for a smaller diameter end cap. This reduces the space available to engage a finger grip inside the end of the end cap.

It is thus an object of the present invention to provide an end cap for use with pipes of smaller diameter that is easily inserted over the end of the pipe, as well as easily removed.

It is also an object of the present invention to provide an end cap which provides some impact resistance when installed over the end of the pipe.

It is also an object of the present invention to provide an end cap which permits the requisite expansion due to weather extremes.

SUMMARY OF THE PRESENT INVENTION

In accordance with the present invention, there is thus provided an open ended cap for an industrial pipe comprising a flexible tubular body having first and second open ends, the first end having an inwardly-extending radial rim serving as an abutment surface for a pipe when inserted into the end cap, the rim extending in a plane perpendicular to the longitudinal axis of the tubular body of the end cap, and a detachable finger grip member, with the finger pull grip member being connected to a tear strip extending downwardly along at least a portion of the longitudinal extent of the tubular body, the radial rim having a gap within a portion thereof across which the finger grip member extends, preferably substantially the entire thickness of the rim, and the finger grip member including a gripping portion extending into the interior of the open first end and adjacent to a portion of the radial rim.

BRIEF DESCRIPTION OF THE DRAWINGS

FIG. 4 is a bottom view of the open-ended pipe cap of FIG. 1.

FIG. 5 is a top perspective view of the open-ended pipe cap inserted upon the end of a pipe.

FIG. 6 is a cross-sectional view of the open-ended pipe cap of FIG. 5 inserted upon a pipe.

DETAILED DESCRIPTION OF THE INVENTION

Figure 1:
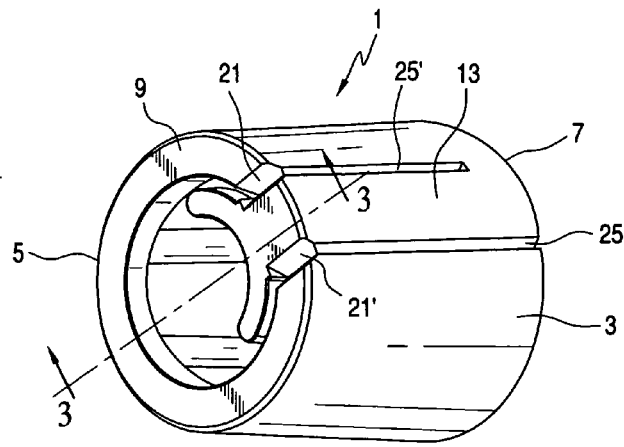
FIG. 1 is a top perspective view of an embodiment of the open-ended pipe cap of the present invention.
Figure 2:
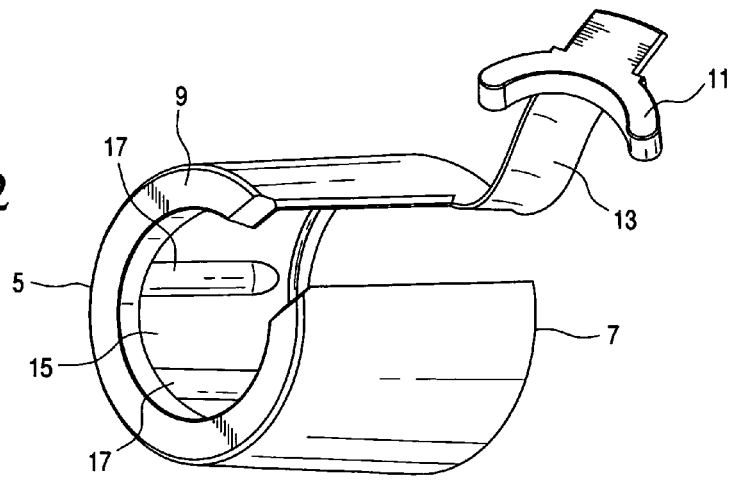
FIG. 2 is a top perspective view of the embodiment of FIG. 1 having the side tear strip torn away.

The invention will be described in connection with FIGS. 1-6.

The pipe end cap 1 of the present invention comprises a tubular body 3 having a first open end 5 and a second open end 7.

As shown in the Figures, a first end 5 of the open ended pipe cap includes an inwardly-extending radial rim 9 which serves as an abutment surface for a pipe 21 when inserted into the end cap. The rim 9 extends in a plane which is perpendicular to the longitudinal axis of the tubular body of the end cap.

The end cap includes a detachable finger grip member 11. The finger grip is connected to a tear strip 13 which extends downwardly along at least a portion of the longitudinal extent of the tubular body.

The finger grip member may take many forms, which forms are not critical to practice of the claimed invention. For instance, the finger grip member may be in the form of an arcuate strip member which extends within a portion of the interior of the open end adjacent the radial rim as shown in the Figures. The arcuate strip extends along a portion of the inner circumference of the radial rim to permit room for insertion of the user's finger in the open end, as well as placing the end of the user's finger against the edge of the finger grip member to urge it upward and outward.

The uppermost portion of the radial rim extends only partially about the circumference of the end of the pipe cap, having a gap or cut-out portion 21, 21' across which the finger grip member extends. The depth of the gap or cut-out portion preferably substantially corresponds to the longitudinal thickness of the radial rim. Desirably, a bottom circumferential surface 23 of the radial rim (FIG. 4) forms a portion of the lower extent of the finger grip member, with the gap or cut-out portion providing on each side of the finger grip member a gap having a depth substantially corresponding to the thickness of the radial rim. This assists in separating the finger grip member from the radial rim portion of the end cap.

While FIG. 4 shows the gap or cut-out extending only to the bottom surface 23, it is within the scope of the invention for the gap or cut-out to extend completely through the thickness of the radial rim In operation, the finger grip member is engaged by the end of the user's finger and the member pulled upwardly away from the hole and downwardly along the side of the tubular body to pull the tear strip away from the tubular body. Upon the tearing of the tear strip along its furthest extent along the tubular body, whereby adjacent portions of the tubular body are caused to be separated from one another, the tubular body may be easily separated from engagement with the end of the pipe. See FIGS. 1 and 2 which depict the sequence of removal of the pull ring and the tearing of the tear strip.

The tear strip 13 may be present either on the exterior surface of the tubular body (FIGS. 1 and 5), or on the interior surface of the tubular body (not shown). The placement of the tear strip is not critical to practice of the invention. However, if it is desired to have a smooth outer surface of the tubular body, the tear strip will be placed on the interior wall surface of the tubular body.

In one embodiment, the opposing edges or tear lines 25, 25' of the tear strip extend to the bottom of the tubular body, such that, when the tear strip is intentionally torn, it completely separates from the body. Alternatively, it is possible for one side of the tear strip to extend down only partially along the longitudinal extent of the tubular body while the other side extends to the bottom of the tubular body, so that, once torn, one end of the tear strip remains in contact with the tubular body, as opposed to being fully torn therefrom. See FIGS. 1 and 5. However, despite that fact that the tear strip may remain in contact with the tubular body, the tubular body is caused to be sufficiently loosened from its grip with the end of the pipe (FIG. 2) and easily removed.

The tear strip 13 may take many forms. For instance, as shown in the Figures, the tear strip may extend downwardly along the tubular body generally in a line substantially perpendicular to the planes of the first and second holes. The tear strip may also extend radially about the side of the tubular member, either along an inner surface, or along the outer surface. The particular configuration and/or dimensions of the tear strip are not critical to practice of the invention.

The tear strip may be formed by conventional means such as by molding parallel linear areas of reduced thickness (tear lines) in relation to adjacent areas of the tubular member, such that the linear areas of reduced thickness are more easily ripped or torn when force is applied thereto by means of gripping and exerting force to the attached finger grip member.

The inner wall of the tubular body may be smooth in accordance with the present invention. However, in order to enhance the fit between the interior wall and the wall of a pipe inserted into the end cap, the interior wall surface 15 of the tubular member optionally may include multiple longitudinal fit beads 17 extending from the interior surface of wall 15 and spaced about the circumference of the interior surface. The beads 17 are configured at their innermost point to provide contact with a pipe wall along the longitudinal surface of the beads upon insertion of the pipe into the end cap. The external surface of a pipe 21, upon being inserted into the end cap 1, abuts the innermost portion of the surface of the beads 17, and become snugly fit within the end cap body due to the combined action of the beads as they become compressed against the external surface of the pipe 21, and in particular, the screw threads. The bead geometry, material selection, and proportional size allow for the beads to slide over the thread crest during assembly, and then cold flow or creep into the adjacent thread to lock the cap onto the threaded end of the pipe.

The beads 17 extend longitudinally along an extent of the inner surface of the wall 15, preferably beginning substantially adjacent one open end and terminating substantially adjacent the other open end. It is thus within the scope of the invention for the beads to terminate short of each end, such that the ends of the beads are spaced from each open end. If spaced from either end, such spacing distance is not particularly critical to practice of the invention. However, to enhance contact with the threads on the pipe, it is preferred that the beads 17 extend substantially to the first open end.

Figure 3:
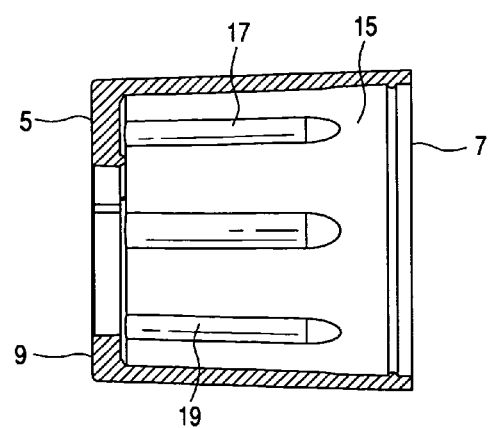
FIG. 3 is a cross-sectional view of the open-ended pipe cap of FIG. 1.

The end of the beads 17 closest to the second open end preferably has a tapered configuration to permit ease of insertion of the end of the pipe 21 into the end cap 1 and over the edge of the beads as shown in FIG. 3. The particular form of tapering is not critical to practice of the invention. The slope of the taper is also not critical, and will generally range from about 0.25 to 3 degrees. The beads extend along the interior surface of the wall 15 in a line parallel to the longitudinal axis of the end cap.

The number of longitudinal beads employed may vary. At a minimum, three fit beads would be employed, preferably equally spaced about the circumference of the wall 15 for purpose of stability upon insertion of the pipe. It is frequently desirable, however, to use a larger number of fit beads in order to minimize the spacing between the beads, while also ensuring a secure fit against the pipe surface due to the greater number of contact points between the fit beads and the pipe wall. A larger number of fit beads also assists in minimizing the entry of extraneous material such as dirt, moisture, etc. into the pipe through the spaces between the fit beads. Obviously, the number of fit beads employed will depend upon the size of the end cap, the size of the fit beads, and the amount of surface of the end cap desired to have fit beads.

The diameter of the fit beads depends upon the size of the end cap, with smaller end caps having fit beads of smaller dimension than larger end caps For example, different diameters of end caps may be employed, as well as different numbers of fit beads used in the end caps.

The fit beads may be of any configuration which provides the requisite contact with the pipe wall. While rounded beads 17 are shown in the Figures, beads which have a more flattened upper surface, may be used with advantage.

The fit beads do not all need to be equally spaced about the circumference of the wall 15, nor do the fit beads have to be placed about the entire circumference. It is only necessary for sufficient fit beads to be at sufficient points about the circumference for the end cap to be snugly attached to the pipe.

For instance, the fit beads may be employed in groupings about the circumference of the wall 15. Other configurations may occur to those skilled in the art, such as groupings with smaller or larger numbers of fit beads, or different numbers of groupings about the circumference, which are within the scope of the invention. It is merely necessary for there to be sufficient contact between the fit beads and the pipe wall for the end cap to be securely attached to the pipe.

The size (diameter and height) of the fit beads is not critical, and is generally determined by the diameter of the end cap. It is important for the fit bead to have sufficient height so as to enable the fit bead to have adequate mass to be compressed in a manner which serves to maintain the end cap in place on the pipe wall.

The geometry of the wall and the fit beads enables several advantages to be achieved. Since the combined thickness of the fit beads and the adjacent wall is significantly greater than thickness of the wall portion which forms the space between the fit beads, this enables the wall portion between the fit beads to be smaller in thickness than might normally be the case. Indeed, the thickness of the wall portion may be reduced by up to 50 percent or so. This enhances the flexibility of such wall portion and enables the end cap wall to flex more easily under extreme temperature conditions.

The tubular member may also have such dimensions as to provide ease of insertion over the end of the pipe, while still ensuring that the end cap is satisfactorily retained on the end of the pipe. For instance, the outside diameter of the end of the tubular member which is inserted over the end of the pipe may be slightly larger than the outside diameter of the end of the tubular member which includes the radial rim. In this way, the end cap is more easily inserted over the end of the pipe, with the end of the pipe being more snuggly fit into the opposite end of the tubular member.

It is contemplated that the open end pipe cap of the present invention will be particularly useful with pipes having diameters ranging from ½ inch to ¾ inch diameters, although the particular size of the pipe is not critical, as the end cap can be molded to fit any desired size of pipe.

The end cap of the present invention may be produced by conventional injection molding techniques. The material employed for the end cap will typically be polyethylene, for the reason that it is cost-effective, is flexible, and provides good weather resistance. Either low density or linear low density polyethylene or flexible vinyl are preferred molding materials for use in the present invention. The use of such polyethylene or vinyl material enables the fit beads, when employed, to both allow the fit bead to slide across the pipe thread crests during installation, yet still relax and creep into the thread after being positioned on the end of the pipe. One of ordinary skill in the art can readily determine acceptable molding materials.

What is claimed is:

1. An open ended cap for an industrial pipe comprising a flexible tubular body having first and second open ends, said first end having an inwardly-extending radial rim serving as an abutment surface for a pipe when inserted into the end cap, the rim extending in a plane perpendicular to the longitudinal axis of the tubular body of the end cap, and a detachable finger grip member, with the finger pull grip member being connected by a portion of the rim to a tear strip extending downwardly along at least a portion of the longitudinal extent of the tubular body, said rim having a gap extending across the rim and not completely through a longitudinal thickness of the rim, and said finger grip member including a gripping portion extending into the interior of said open first end and adjacent to a portion of said rim.

2. The end cap of claim 1, wherein the depth of said gap substantially corresponds to the thickness of the finger grip member within said gap.

3. The end cap of claim 1, wherein one lateral edge of said tear strip extends downwardly along a portion of said longitudinal extent of the tubular body, whereby an opposing lateral edge extends along the full extent of said tubular body.

4. The end cap of claim 1, wherein said tear strip extends downwardly along the longitudinal extent of the tubular body.

5. The end cap of claim 1, wherein said finger grip member is an arcuate-shaped strip.

6. The end cap of claim 5, wherein said longitudinal fit beads are evenly spaced about the entire circumference of said wall.

7. The end cap of claim 5, wherein said fit beads have a curved surface.

8. The end cap of claim 5, wherein said longitudinal fit beads terminate at a point spaced from said first end.

9. The end cap of claim 1, wherein said tubular body has an interior wall surface having multiple compressible longitudinal fit beads extending from said interior wall surface and spaced about the circumference of said interior wall surface, said beads configured to provide contact along the longitudinal surface of the beads with the external surface of a pipe upon being inserted into said end cap, an end of said longitudinal fit beads closest to said first second open end being tapered.

10. The end cap of claim 1, wherein said gap is V-shaped.

11. The end cap of claim 1, wherein a bottom of said rim is formed by a continuous surface.

12. The end cap of claim 1, wherein a portion of a bottom circumferential surface of the rim connects the grip member to the tear strip.

* * * * *